US012488561B2

(12) United States Patent
Bacarella et al.

(10) Patent No.: US 12,488,561 B2
(45) Date of Patent: Dec. 2, 2025

(54) MULTI-VARIABLE PATTERN RECOGNITION FOR PREDICTIVE DEEP LEARNING MODELS

(71) Applicant: International Business Machines Corporation, Armonk, NY (US)

(72) Inventors: David Bacarella, Naperville, IL (US); Arunava Majumdar, Chicago, IL (US); Stephan Joseph Roorda, Fuquay-Varina, NC (US); Sumit Patel, Scottsdale, AZ (US)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 16/887,522

(22) Filed: May 29, 2020

(65) Prior Publication Data

US 2021/0374484 A1 Dec. 2, 2021

(51) Int. Cl.

| | |
|---|---|
| ***G06V 10/75*** | (2022.01) |
| ***G06F 18/2137*** | (2023.01) |
| ***G06F 18/24*** | (2023.01) |
| ***G06N 20/00*** | (2019.01) |
| ***G06V 10/77*** | (2022.01) |
| ***G06V 10/774*** | (2022.01) |
| ***G06V 10/776*** | (2022.01) |

(52) U.S. Cl.

CPC .... *G06V 10/7553* (2022.01); *G06F 18/21375* (2023.01); *G06F 18/24* (2023.01); *G06N 20/00* (2019.01); *G06V 10/7715* (2022.01); *G06V 10/774* (2022.01); *G06V 10/776* (2022.01)

(58) Field of Classification Search

CPC .............. G06F 18/21375; G06F 18/24; G06V 10/7553; G06V 10/7715; G06V 10/774; G06V 10/776

See application file for complete search history.

(56) References Cited

U.S. PATENT DOCUMENTS

| | | | |
|---|---|---|---|
| 9,613,155 | B2 | 4/2017 | Hill |
| 10,216,750 | B2 | 2/2019 | Allyn |

(Continued)

FOREIGN PATENT DOCUMENTS

| | | |
|---|---|---|
| CN | 110008279 A | 7/2019 |

OTHER PUBLICATIONS

Zhang et al., "A Deep Neural Network for Unsupervised Anomaly Detection and Diagnosis in Multivariate Time Series Data", July, 7 , 2019, Proceedings of the AAAI Conference on Artificial Intelligence, vol. 33 No. 01: AAAI-19, IAAI-19, EAAI-20, pp. 1409-1416. (Year: 2019).*

(Continued)

*Primary Examiner* — Brent Johnston Hoover

(74) *Attorney, Agent, or Firm* — David K. Mattheis

(57) ABSTRACT

Pattern recognition by receiving a set multi-variable data records, each record including a plurality of variables, representing at least two of the plurality of variables as geometric shapes, defining a boundary enclosing the geometric shapes, configuring at least one geometric shape to move within the boundary, capturing a location of each of the geometric shapes within the boundary as a system state, one or more times, combining one or more system states as a system signature, providing a model trained to recognize patterns in system signatures, and recognizing a pattern in the system signature.

20 Claims, 2 Drawing Sheets

START

RECEIVE INPUT DATA 210

TRANSLATE DATA TO SHAPES 220

DEFINE BOUNDARY 230

SET SHAPES IN MOTION 240

CAPTURE SYSTEM STATES 250

FORM SYSTEM SIGNATURE 260

PROVIDE ANALYSIS MODEL 270

RECOGNIZE PATTERN 280

200

(56) References Cited

U.S. PATENT DOCUMENTS

| | | | |
|---|---|---|---|
| 10,303,738 | B2 | 5/2019 | Toomre |
| 10,552,445 | B1 | 2/2020 | Love |
| 11,215,840 | B2 | 1/2022 | Carrascal De Las Heras |
| 2015/0026606 | A1* | 1/2015 | Hill ....................... G06F 16/904 715/760 |
| 2017/0323028 | A1 | 11/2017 | Jonker |
| 2018/0365337 | A1 | 12/2018 | Sexton |
| 2020/0124868 | A1 | 4/2020 | Carrascal De Las Heras |

OTHER PUBLICATIONS

"Language Visualization and Multilayer Text Analysis", retrieved from the Internet May 7, 2020, 2 pages, <https://people.ece.cornell.edu/land/OldStudentProjects/cs490-95to96/TONYG/Language.Viz1.html>.

Carvalho, Andrei, "Language Data Visualization", VisualCue, May 6, 2016, 4 pages, <https://visualcue.com/language-data-visualization/>.

Donalek et al., "Immersive and Collaborative Data Visualization Using Virtual Reality Platforms", In 2014 IEEE International Conference on Big Data, Oct. 2014, pp. 609-614.

Kozma, László ,"Visualizing the languages of the world", LK Blog, Aug. 12, 2013, 7 pages, <http://lkozma.net/blog/languages-visualization/>.

Pustejovsky et al., "VoxML: A Visualization Modeling Language", arXiv:1610.01508v1 [cs.CL] Oct. 5, 2016, 8 pages.

* cited by examiner

NETWORKED COMPUTER SYSTEM, 1000
CLIENT, 104
NETWORK 114
CLIENT, 110
SERVER SUB-SYSTEM, 102
SERVER COMPUTER, 150
COMMUNICATIONS UNIT, 152
MEMORY, 158
RAM, 160
CACHE, 162
PERSISTENT STORAGE, 170
PROGRAM, 175
PROCESSOR SET, 154
I/O INTERFACE SET, 156
140
DISPLAY, 180
EXTERNAL DEVICES, 190

MULTI-VARIABLE PATTERN RECOGNITION FOR PREDICTIVE DEEP LEARNING MODELS

BACKGROUND

The disclosure relates generally to recognition of multi-variable patterns in a data set. The disclosure relates particularly to recognizing multi-variable patterns in data using geometric shapes.

Typical information analysis systems including artificial intelligence systems and natural language processing systems, focus upon mathematical relationships expressed by input data sets. Such systems may be limited by the rules available to express the relationships found in the data and the computational costs associated with calculating those relationships.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable pattern recognition in multi-variable data sets.

Aspects of the invention disclose methods, systems and computer readable media associated with pattern recognition by receiving a set multi-variable data records, each record including a plurality of variables, representing at least two of the plurality of variables as geometric shapes, defining a boundary enclosing the geometric shapes, configuring at least one geometric shape to move within the boundary, capturing a location of each of the geometric shapes within the boundary as a system state, one or more times, combining one or more system states as a system signature, providing a model trained to recognize patterns in system signatures, and recognizing a pattern in the system signature.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
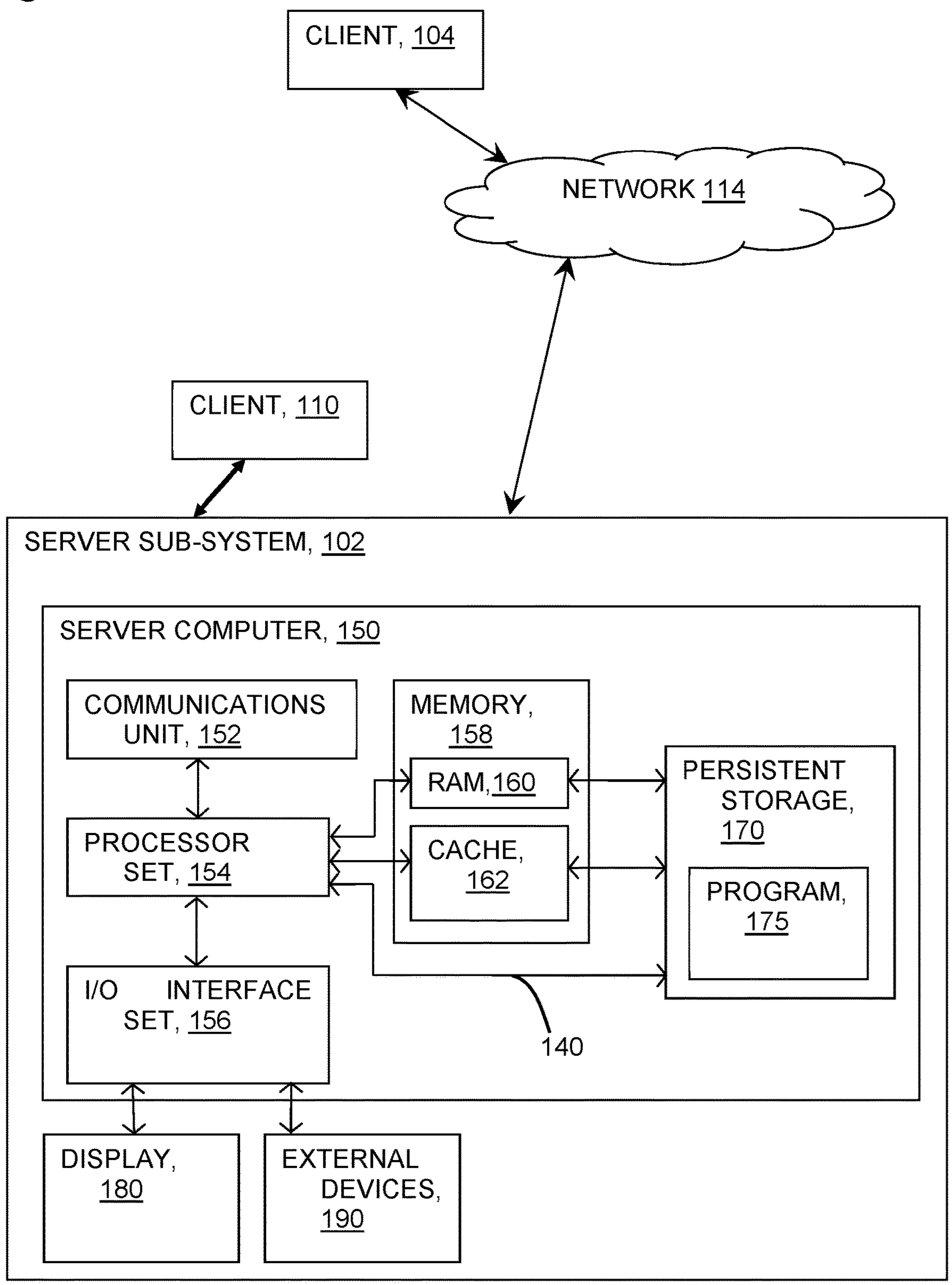
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., representing multi-variable data as geometric shapes data particles, defining a boundary of a space enclosing the data particles, setting at least one data particle in motion within the boundary, capturing the locations of respective data particles within the boundary at a succession of instances as particles move, combining the succession of captured location instances to form a data signature, providing the formed signature to a trained machine learning model, extracting data patterns from the signature using the machine learning model, etc.). These solutions are not abstract and cannot be performed as a set of mental acts by a human due to the processing capabilities needed to facilitate data set pattern recognition, for example. Further, some of the processes performed may be performed by a specialized computer for carrying out defined tasks related to memory operations. For example, a specialized computer can be employed to carry out tasks related to data set pattern recognition or the like.

In an embodiment, input data includes a set of data records. Each data record includes a plurality of variable values. The input data may relate to financial market and transaction data, system security/computing network utilization data, weather condition data, health care data, e.g., diagnostic imaging data, or other multi-variable data. In this embodiment, the input data set record variable values constitute values within a range. The values of each variable of each record are considered a property of the variable, the range of possible, or typical, values for each variable are also considered a property of the variable. Properties may be mapped to data particles in different ways. For example, for financial data including stock prices, the price of a stock may be mapped to a first data particle while the current performance of the stock price—rising or falling in price—may be mapped to a second data particle having a color representative of the change in the price. Alternatively, a stock may be presented as a first data object and the performance of the stock price as a second data object having a size relative to changes in the stock price. Choices regarding mapping specific input data set properties to data objects may be made by a user as a reflection of the input data set properties of greatest interest to the user. In an embodiment, property mapping may be based upon the relative level of value fluctuations of each variable within the input data set.

In an embodiment, the method of the disclosed invention translates an input data set into a collection of data particles expressed as a plurality of geometric shapes. Each shape embodying properties of one or more variables of a data record of the input data set; (e.g., the size and color of a shape relate to the value of a variable.) In this embodiment, the method maps or translates multiple variables to a single shape, e.g., wind speed and direction are mapped to a single circle, the speed represented by the color of the circle and the direction represented by the initial direction of motion of the circle. In this embodiment, each shape represents a single variable value; (e.g., each of temperature, dew point, humidity, and barometric pressure are represented as individual geometric shapes to convey the properties of the variable data.)

In an embodiment, the method normalizes the range of likely or possible values for an input variable and defines correspond ranges of geometric shape sizes and colors for the range of values. In this embodiment, values between 30 and 40% of the value range are represented as shapes having the 30-40% size and a color associated with the 30-40% value. In this embodiment, the number of values for each range may be assigned by default such as 10 values for each of the size and shape ranges. In an embodiment, a user selects the number of divisions per size and shape range for each variable. Each geometric shape, data particle, also has an initial location, set by the method by default, or defined according to user input. In an embodiment, all data particles are initially located at a common location, such as the origin of a cartesian coordinate system, for a two-dimensional system, or the origin of a polar or spherical coordinate system, for a three-dimensional system. In an embodiment, each data particle has a unique initial location defined by two-dimensional or three-dimensional coordinates.

In an embodiment, the method of the pattern recognition program defines a boundary enclosing the initial locations of the data particles of the input data record. The defined boundary may be two- three- or n-dimensional. The method may utilize any suitable coordinate system to define the boundary and the respective locations of the data particles within the boundary.

After translating an input data records to data particles and defining a boundary enclosing the data particles, the method sets the data particles in motion from their initial locations using the defined motion control parameters—particle speed and initial direction of travel—for each particle. In an embodiment, the method sets the data particle motion parameters as fixed values independent from the input data values. In an embodiment, the method sets the data particle motion parameters in terms of variable value magnitudes from the input data record, e.g., setting the initial direction of a weather data wind particle as the wind direction value. Data particles move from their initial locations and interact with at least the boundary. In an embodiment, the particle-boundary interactions are elastic, such that the particle does not lose energy during the interaction. The angle of reflection of the particle from the boundary equals the angle of incidence. In an embodiment, the particles do not interact with each other, instead each particle passes through all others without interacting. In an embodiment, the particles interact elastically with each other and the boundary according to first principles.

In an embodiment, the method captures the initial state of the system of data particles and boundary, prior to the motion of the data particles. Subsequent to the initialization of the data particle motion, the method captures a series of system states at regular intervals as the data particles move and interact with the boundary. In an embodiment, the method tracks the locations of the data particles as they move within the boundary capturing the sequence of system states.

In an embodiment, the method assigns a randomly generated transparency value to each data particle. The relative data particle transparencies determine how overlapping particles are viewed in the captured system state. Data particles occluded in the system state represent lost information for that system state. In an embodiment, such information loss is mitigated by employing a larger boundary for the data particles and reducing the relative speeds of the data particles.

In an embodiment, the method employs three-dimensional data particles and a three-dimensional boundary. In this embodiment the method encodes additional input data set properties as the distance between data particles and a selected face of the boundary, and the effect this distance has upon the relative size of the particles. The method further encodes input data as data particle rotational motion and as more complex three-dimensional paths for the data particles.

In an embodiment, the method captures multiple system states and forms multiple system signatures by monitoring the system through each face of the three-dimensional boundary—e.g., six sets of system states and six corresponding system signatures obtained by concurrently monitoring the system through the six faces of a cubic boundary. Compiling multiple concurrent system signatures increases the precision when differentiating between signatures and when analyzing future input data for patterns. Concurrently capturing multiple system states through different boundary faces enables the method to apply unique color filters to the system states captured through each face. The method utilizes color filters to test for the presence or absence of particular data particles according to particle color; e.g., a blue particle will be invisible in a system state captured through a blue filter, but visible through a clear or other color filter.

In an embodiment, repeated processing of an input data set yields identical system signatures—a system identity signature. Subsequent processing of altered input data yields a system signature that differs from the identity signature. In an embodiment, the system forms the identity signature of a first data set and a second signature from a different input data set. In this embodiment, the method analyses each signature by converting the signature to a grayscale image, calculating a local binary pattern (LBP) function mask of each image, converting the LBP masks to histograms, and comparing the two histograms. The comparison yields a percentage value indicating how similar or different the two histograms are. 100% indicates that the histograms—and corresponding input data sets are identical. In an embodiment, the method converts each signature to a color histogram. In this embodiment, the method uses the color histogram to quickly determine the presence, or absence of a particular color from the system signature—where the color signifies the presence of particular information in the input data for the system signature. Color histograms enable the method to compare signatures in terms of the frequency and magnitude of specific input data.

In an embodiment, input data includes observed behaviors, such as network resource utilization behaviors, logging in, uploading or downloading information, etc. In this embodiment, system signatures capture behavior over time, e.g., a single day. Subsequent comparisons between signature indicate how similar day-to-day behaviors are, and provide an indication of abnormal behavior—e.g., a histogram comparison of less than about 60%, possibly indicating unusual system resource utilization.

In an embodiment, the method trains the model to analyze signatures to recognize patterns occurring prior to significant events—e.g., component failures. In an embodiment, the trained model analyzes input data to detect the identified patterns, predict the impending component failure, and to provide an output initiating steps to prevent the failure. As an example, the method trains a model using performance data of system processors—processor utilization, temperature, fan speed, etc. The model learns from labeled input data to identify systems signatures leading to processor failure. The trained model then analyzes real-time system processor data, predicts impending failure and initiates a response to prevent the failure—increasing fan speed, shutting down, etc.

In an embodiment, the method adjusts the speed and/or size of different data particles to alter the overall particle effect on the system signature. In this embodiment, the system applies external forces to stable data particles—those with unchanging variable values—causing those particles to coalesce in one area of the boundary, enabling particles associated with more transient data values to more significantly affect the system signature.

In an embodiment, the system signatures embody the mathematical relationships between the input data set variables. Comparing system signatures for input data sets with known variable mathematical relationships with system signatures for input data where the mathematical relationships are unknown, the test data, enables the method to identify similar or identical system signatures, and to infer similar or identical mathematical relationships for the test data. For example, the system signatures for a weight moving and hanging on a spring would be similar to the system signatures for the charging and discharging of a capacitor in a simple capacitance circuit.

In an embodiment, after collecting the series of system state images, the method combines the collected series into a single image representing the system signature for the input data record.

In an embodiment, data particles, initial locations, movement parameters and boundaries are defined for each input data record. System states are collected, and system signatures are formed for each record. In an embodiment, the method processes a series of input data records as a system. In this embodiment, the data particles move and change according to changes in the input data variable values over the course of the system of input data records. In an embodiment, the method combines multiple systems of records to form the system signature.

In an embodiment, the method processes a set of input data records as described above, capturing the new system state represented by each new record and combining the set of system states as the system signature. In this embodiment, the method further interpolates input data values between input data records to enhance the system signature.

In an embodiment, the method processes the system signature as a machine vision system processing a texture. In this embodiment, the system signature may be pre-processed by applying a smoothing function, such as a Gaussian blur, to the original system signature to reduce the effect of sharp edges in the signature.

In an embodiment, the method follows the procedure described above to process training input data. the processing yields a set of training system signatures. The method uses the training signatures in the training of a machine learning model intended for processing real, or in-use data. The training data set and resulting training signatures mimic or otherwise relate to the input data associated with the intended use of the completely trained model and method. For example, the method uses medical diagnostic data to train a diagnostic image classification model, electroencephalogram (EEG) data for an EEG analysis model, financial transaction data to train a financial analysis model, network utilization activity to train a network security model, game scenario data to learn to play a game, weather data for a weather model, and so on.

The machine learning model may include recurrent neural networks, convolutional neural networks, long short-term memory networks, deep neural networks or other machine learning architectures such as classification structures, clustering structures, dimensionality reducing structures, ensemble learning methods, and reinforcement learning structures, as appropriate, for the intended use of the model and method. In an embodiment, the method uses back propagation and a defined loss function to tune the network node weights in training the model.

In an embodiment, after training the machine learning model, the method receives real input data—as opposed to the training input data previously processed. The method processes the real input data into geometric data objects, initializes the motion of the objects, captures system states, combines system states to form system signature and passes the formed system signatures to the trained model. The trained model returns the desired type of output after processing the provided system signature and recognizing patterns in the signature in view of the model's training. Diagnostic predictions, weather forecasts, game activities, financial analysis, or other outputs depending upon the input data and the nature of the trained model. As an example, a model trained to classify weather data as indicating whether or not it is currently raining, by training the model using labeled weather data associated with conditions where it is, or is not, raining, classified the input data as 'raining' or 'not raining' and produces the associated output.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise pattern recognition program (not shown) together with sufficient computing resource (processor, memory, network communications hardware) to execute the program. Client devices 104 and 110 serve as user input and output devices enabling a user to submit input data to the pattern recognition program and to receive appropriate output in return. In an embodiment, client device 104 and 110 serve as data input ports for pattern recognition programs resident upon server sub-system 102. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server sub-system 102 include one or more server computers 150. Server sub-system 102 may be local to a user environment or may comprise edge cloud or cloud resources located remotely from the user environment and utilized as needed.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the pattern recognition program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., pattern recognition program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
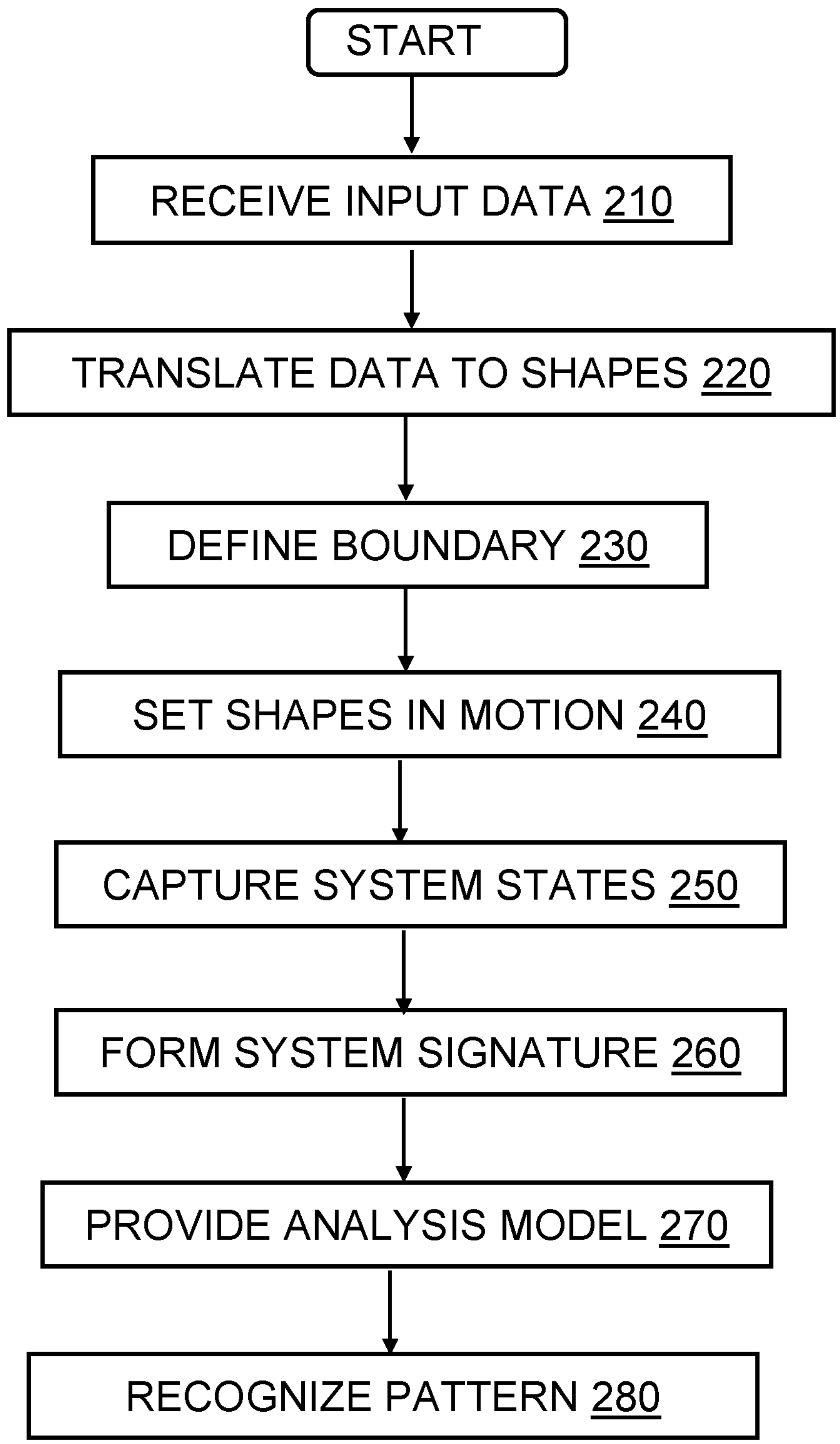
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of pattern recognition program 175, receives input data. The input data includes multiple data records, each data record has a plurality of variable values. Each data record can be considered an n-dimensional data record, each variable constituting a dimension of the record.

At block 220, the method of pattern recognition program 175 translates the data of the records of the input data set into a corresponding set of geometrically shaped data particles—e.g., circles, squares, rectangles, triangles, trapezoids, etc. In an embodiment, the range of values of each variable are expressed by the properties of the geometrically shaped data particle. As an example, an input data set consisting of weather data includes temperature, dew point, humidity, wind speed and direction, and barometric pressure, recorded at particular dates and times for a specific location. In an embodiment, the method encodes each of those input variables as a geometric shape, e.g., a circle. For each of the variables, the method considers the potential range of values of the variable, normalizes that range and expresses the range as a corresponding range of property values for the corresponding circle—the temperature circle size and shape each correspond to the temperature value normalized for a range of between 0 and 100 degrees Fahrenheit—the size ranges from a 5 pixel circle for 0 degrees to a 50 pixel circle for 100 degrees. Similarly, the color of the temperature circle ranges from a light purple—lavender—for temperatures between 0 and 10 degrees, to a blue-violet for temperatures between 90 and 100 degrees. The method sets an initial temperature location as the original of a cartesian coordinate system and sets the initial motion of each circle as proceeding from the origin at 4 degrees from 0 and at 75% of the maximum allowed particle velocity—established by global system parameters for all particles. In an embodiment, the method adjusts the impact of the respective variables upon the eventual system signature by weighting the respective input variables. In this embodiment, the method increases the weight of a particular variable by increasing the relative sizes of the data particles associated with the variable. In this embodiment, the method reviews the changes in the variables values across the set of input data and assigns greater weights (sizes) to those variables having more fluctuation in the magnitude of the variable values across the set of data records.

In this embodiment, the method encodes all the other weather data dimensions as a similar set of circles having a range of sizes and colors particular to the range of values for the individual variables and established by the values of each variable in each record. Initial locations and movement parameters for each variable are also set.

For each record, at block 230, the method of pattern recognition program 175 then defines a boundary enclosing all the data particles of each record. In an embodiment, the boundary constitutes a two-dimensional space enclosing the cartesian coordinate origin and the set of data particles for each record. In an embodiment, the boundary constitutes a three-dimensional space surrounding an origin and a set of three-dimensional data particles. The disclosed methods are not limited to two- or three-dimensional spaces. The method may define higher dimensional boundaries and spaces enclosing higher dimensional data particles to appropriately convey the properties of the input data variables. In an embodiment, the method defines the same boundary for each data record of the input data set.

After encoding the data as particles within a defined boundary, at block 240 the method initializes the motion of at least one of the set of particles according to the defined parameters for each particle type. In an embodiment, the particles move as determined by the parameters, interacting elastically with the boundary such that the angle of incidence of the particle with the boundary determines the angle of reflection and no particle energy is lost in the interaction with the boundary. In an embodiment, the particles do not interact with each other but are instead transparent to each other and pass through each other without interaction. In an embodiment, the particles are not transparent to each other and interact elastically with each other according to first principles of motion, the interactions determined by the locations and motion of the particles. In this embodiment, the method encodes an additional property of particle mass, associated with a value of the respective variable, to each particle and the particle interactions includes consideration of the relative masses of the respective particles.

At block 250, the method captures a system state—the current location of the set of data particles within the boundary—at a succession of points as the particles move within the boundary. In an embodiment, the succession of capture points corresponds to uniform intervals of time as the data particles move within the boundary. In an embodiment, the method captures the system state as an image of the system state encoded as the set of pixels including the location and color of each pixel of the composite image of the locations of the set of data particles for each record. For a three-dimensional boundary, the method captures the system state as a set of voxels corresponding to the space contained within the defined boundary, with each voxel including the data associate with the set of data particles occupying the voxel. For embodiments having data particles which are transparent to each other, a single pixel/voxel may include data relating to a set of data particles occupying the same individual pixel/voxel. In an embodiment, the composite data includes the distinct data values for each of the overlapping or co-occupying data particles with no computation of an interaction between them in the pixel/voxel.

In an embodiment, the succession of system states correspond to the captured locations of data particles as the method depicts the data particles associated with a temporal sequence of data records across the time interval associated with the data records. In this embodiment, the properties of the data particles change as the values of the respective variables changes across the set of data records. In this embodiment, the method derives the parameters associated with the motion of the data particles from variable value changes over time and captures at least one system state for each data record—in an embodiment, the method interpolates variable values, data particle properties and corresponding system states between successive data records and captures additional system states associated with the interpolated values.

At block 260, the pattern recognition method combines the succession of captured system states into a single composite system state, or system state texture, or system signature including the location data for the data particles captured in each of the successive system states. In an embodiment, the method captures a system signature for a succession of captured states for each data record of the input data. In an embodiment, the method captures a single system state for a succession of data records, including interpolated data records—monitored across a time interval associated with the set of data records.

At block 270, the method provides the captured system signature to a trained machine learning model. At block 280, the machine learning model of the method processes the provided system signature according to its training and provides an output associated with one or more patterns recognized in the input system signature data.

In an embodiment, the machine learning model classifies the input data as one of a set of possible categories. For weather data, the machine learning model could be trained to distinguish between instances where it is raining and those where it is not. In this embodiment, the input weather data yields a model output classifying the data as raining or not raining.

In an embodiment, the model of the method comprises deep neural network configured to process sequences of input data—such as long short-term memory (LSTM) network. In this embodiment, the method passes a sequence of system signatures—each signature associated with a single data record—or a sequence of system states associated with a single data records, and the trained model provides an output of a predicted next system signature or system state. In this embodiment, the method then reverses the geometric encoding process and provides the data record corresponding to the predicted system states or system signature.

In an embodiment, the method provides a model trained to play a game. In this embodiment, training the model includes providing a training set of labeled input data records consisting of variable data associated with the state of a game in progress. The training data set labels indicate the outcome of the game—a win or a loss. In training the model learns the association between system signatures captured over the course of the game and the eventual outcome. The machine learning model does not learn the rules of the game—only the association of system state/signature patterns and a final outcome. In this embodiment, the trained model learns to generate a next possible system signature—corresponding to a next "move" in the game. Reversing the geometric shape encoding provides the details of the move enabling the machine learning model of the method to play the game without knowing the rules. In this embodiment, training the machine learning model includes having the machine learning model extract rules for the game in terms of acceptable and unacceptable moves from any given system signature, together with a likelihood that each of the acceptable, or allowed. moves will lead to a positive outcome—a win. In this embodiment, the method tints system states according to the level of positive outcome associated with the state—and the progression of states and learns to follow a positive progression of system states to win. In an embodiment, the model proceeds from an initial state and presumes that all actions will lead to a positive outcome. Feedback from the labeled data modifies this presumption resulting in the model assigning a probability for a positive outcome to each possible progression of system states.

In an embodiment, the method receives input data associated with network computing infrastructure utilization. In this embodiment, the method analyzes the input data regarding computing resource utilization and identifies usage patterns which are abnormal—potentially indicative of network security issues.

In an embodiment, the method receives patient health care information, from patients who have consented to, or otherwise authorized, an automated review of their health data. In this embodiment, the method reviews the data and identifies abnormal patterns developing over time. In this embodiment, the health care data may include diagnostic imaging data.

As an example, input data includes a collection of data records, each record constituting a row of data including a plurality of data columns. Each column constituting a separate input variable. Disclosed methods translate the input data into a plurality of geometric shapes, each shape associated with at least one input variable, the properties of the shape are associated with the properties of the variable. The method defines a boundary enclosing the shapes. The shapes and the boundary are defined by a number of dimensions, the number of dimensions selected according to the scope and range of the input data. The method initializes the locations of the shapes inside the boundary and sets the shapes in motion within the boundary. The method captures a series of system states for the system of shapes within the boundary and combines the series of captured states into a composite state, or system signature. The method provides the system signature to a model, for analysis. The model yields an analysis output, associated with analysis of the system signature, input.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for pattern recognition, the method comprising:

receiving, by one or more computer processors over a network, a set of multi-variable data records, each record comprising a plurality of variables;

representing, by the one or more computer processors, at least two of the plurality of variables as geometric shapes;

defining, by the one or more computer processors, a boundary enclosing the geometric shapes;

initializing, by the one or more computer processors, motion of at least one geometric shape within the boundary;

capturing, by the one or more computer processors, a location of each of the geometric shapes within the boundary as a system state, at a succession of instances;

combining, by the one or more computer processors, one or more of the system states to form a first system signature;

storing the system signature in persistent storage;

providing, by the one or more computer processors, a model trained to recognize patterns in system signatures, wherein training the model comprises receiving labeled input data records, the data records comprising variable data associated with a state of a system, the label indicating an outcome;

processing the labeled input data records by;

defining data particles, initial locations, movement parameters and boundaries for each record of the input data;

processing a series of input data records as a system;

moving and changing data particles according to changes in input data variable values;

collecting system states according to locations of the data particles;

forming system signatures according to the system states; and using the system signatures, back propagation and a defined loss function to tune network node weights of the model to train the model to associate system signatures with the outcome;

storing the model in persistent storage;

predicting, by the one or more computer processors, using the first system signature and the trained model, a system component failure; and initiating, by the one or more computer processors, over the network, a response to prevent the system component failure.

2. The computer implemented method according to claim 1, further comprising representing each variable of the set of multi-variable data records as a separate geometric shape.

3. The computer implemented method according to claim 1, further comprising representing multiple variables of the set of multi-variable data records as a single geometric shape.

4. The computer implemented method according to claim 1, wherein initializing at least one geometric shape to move within the boundary comprises configuring the geometric shape to move according to a magnitude of a variable of the set of multi-variable data records.

5. The computer implemented method according to claim 1, wherein the model is trained to classify patterns in the system signature.

6. The computer implemented method according to claim 1, wherein initializing at least one geometric shape to move within the boundary comprises configuring the geometric shape to move according to changes in values of the set of multi-variable data records over time.

7. The computer implemented method according to claim 1, wherein the boundary comprises more than two dimensions.

8. A computer program product for pattern recognition, the computer program product comprising one or more computer readable storage devices and program instructions collectively stored on the one or more computer readable storage devices, the stored program instructions comprising:

program instructions to receive a set of multi-variable data records, each record comprising a plurality of variables, over a network;

program instructions to represent at least two of the plurality of variables as geometric shapes;

program instructions to define a boundary enclosing the geometric shapes;

program instructions to initialize motion of at least one geometric shape within the boundary;

program instructions to capture a location of each of the geometric shapes within the boundary as a system state, at a succession of instances;

program instructions to combine one or more of the system states to form a first system signature;

program instructions to store the first system signature in persistent storage;

program instructions to provide a model trained to recognize patterns in system signatures; wherein training the model comprises receiving labeled input data records, the data records comprising variable data associated with a state of a system, the label indicating an outcome;

processing the labeled input data records by;

defining data particles, initial locations, movement parameters and boundaries for each record of the input data;

processing a series of input data records as a system;

moving and changing data particles according to changes in input data variable values;

collecting system states according to locations of the data particles;

forming system signatures according to the system states; and using the system signatures, back propagation and a defined loss function to tune network node weights of the model to train the model to associate system signatures with the outcome;

program instructions to store the model in persistent storage;

program instructions to predict a system component failure using the first system signature and the model; and program instructions to initiate a response to prevent the system component failure.

9. The computer program product according to claim 8, the stored program instructions further comprising program instructions to represent each variable of the set of multi-variable data records as a separate geometric shape.

10. The computer program product according to claim 8, the stored program instructions further comprising program instructions to represent multiple variables of the set of multi-variable data records as a single geometric shape.

11. The computer program product according to claim 8, the stored program instruction to initialize motion of at least one geometric shape to move within the boundary comprising program instructions to configure the geometric shape to move according to a magnitude of a variable of the set of multi-variable data records.

12. The computer program product according to claim 8, wherein the model is trained to classify patterns in the system signature.

13. The computer program product according to claim 8, the stored program instructions to initialize the at least one geometric shape to move within the boundary comprising program instructions to configure the geometric shape to move according to changes in values of the set of multi-variable data records over time.

14. The computer program product according to claim 8, wherein the boundary comprises more than two dimensions.

15. A computer system for pattern recognition, the computer system comprising:

one or more computer processors;

one or more computer readable storage devices; and stored program instructions on the one or more computer readable storage devices for execution by the one or more computer processors, the stored program instructions comprising:

program instructions to receive a set of multi-variable data records, each record comprising a plurality of variables, over a network;

program instructions to represent at least two of the plurality of variables as geometric shapes;

program instructions to define a boundary enclosing the geometric shapes;

program instructions to initialize motion of at least one geometric shape within the boundary;

program instructions to capture a location of each of the geometric shapes within the boundary as a system state, at a succession of instances;

program instructions to combine one or more of the system states to form a first system signature;

program instructions to store the first system signature in persistent storage;

program instructions to provide a model trained to recognize patterns in system signatures; wherein training the model comprises receiving labeled input data records, the data records comprising variable data associated with a state of a system, the label indicating an outcome;

processing the labeled input data records by;

defining data particles, initial locations, movement parameters and boundaries for each record of the input data;

processing a series of input data records as a system;

moving and changing data particles according to changes in input data variable values;

collecting system states according to locations of the data particles;

forming system signatures according to the system states; and using the system signatures, back propagation and a defined loss function to tune network node weights of the model to train the model to associate system signatures with the outcome;

program instructions to store the model in persistent storage;

program instructions to predict a system component failure using the first system signature and the model; and program instructions to initiate a response to prevent the system component failure.

16. The computer system according to claim 15, the stored program instructions further comprising program instructions to represent each variable of the set of multi-variable data records as a separate geometric shape.

17. The computer system according to claim 15, the stored program instructions further comprising program instructions to represent multiple variables of the set of multi-variable data records as a single geometric shape.

18. The computer system according to claim 15, the stored program instruction to initialize motion of at least one geometric shape to move within the boundary comprising program instructions to configure the geometric shape to move according to a magnitude of a variable of the set of multi-variable data records.

19. The computer system according to claim 15, wherein the model is trained to classify patterns in the system signature.

20. The computer system according to claim 15, the stored program instructions to initialize the at least one geometric shape to move within the boundary comprising program instructions to configure the geometric shape to move according to changes in values of the set of multi-variable data records over time.

* * * * *